(12) United States Patent
Clark et al.

(10) Patent No.: US 8,862,287 B1
(45) Date of Patent: Oct. 14, 2014

(54) FOUR DIMENSIONAL TRAJECTORY BASED OPERATION FLIGHT PLANS

(75) Inventors: Jason William Clark, Evergreen, CO (US); Alexander Korolev, Aurora, CO (US); Diana Marie Baca, Denver, CO (US)

(73) Assignee: The Boeing Company, Chicago, IL (US)

( * ) Notice: Subject to any disclaimer, the term of this patent is extended or adjusted under 35 U.S.C. 154(b) by 203 days.

(21) Appl. No.: 12/781,525

(22) Filed: May 17, 2010

(51) Int. Cl.
*G01C 21/10* (2006.01)
*G01C 23/00* (2006.01)

(52) U.S. Cl.
USPC ........................................ 701/3; 705/3; 705/2

(58) Field of Classification Search
CPC ...................... B64D 2045/0055; G08G 5/0034
USPC .............................................. 705/1–3; 701/3
See application file for complete search history.

(56) References Cited

U.S. PATENT DOCUMENTS

| | | | |
|---|---|---|---|
| 4,774,670 | A | 9/1988 | Palmieri |
| 5,051,910 | A | 9/1991 | Liden |
| 6,049,754 | A | 4/2000 | Beaton et al. |
| 6,442,526 | B1 | 8/2002 | Vance et al. |
| 6,658,349 | B2 | 12/2003 | Cline |
| 6,970,784 | B2 | 11/2005 | Shinagawa |
| 7,162,335 | B2 | 1/2007 | He et al. |
| 7,577,501 | B2 | 8/2009 | Tafs et al. |
| 7,623,960 | B2 | 11/2009 | Wise et al. |
| 7,756,632 | B2 * | 7/2010 | Wise et al. ..................... 701/465 |
| 7,792,615 | B2 | 9/2010 | Aimar |
| 8,209,115 | B2 | 6/2012 | Lucas et al. |
| 8,244,466 | B2 | 8/2012 | DeJonge et al. |
| 8,396,614 | B1 | 3/2013 | Pschierer |

OTHER PUBLICATIONS

Joel K. Klooster & Ana Del Amo, Controlled Time-of-Arrival Flight Trials, Eighth USA/Europe Air Traffic Management Research and Development Seminar, ATM2009.*
U.S. Appl. No. 12/781,548, filed May 17, 2010, Pschierer.
Flight and Flow Information for a Collaborative Environment—A Concept, prepared by Air Traffic Management Requirements and Performance Panel, Draft Version A.4, Mar. 1, 2010, pp. 1-138.
Jackson et al., "CDA with RTA in a Mixed Environment", 28th Digital Avionics Systems Conference, Oct. 25-29, 2009, IEEE, pp. 1-10.
Stibor et al., "Implementation of Continuous Descent Approaches at Stockholm Arlanda Airport, Sweden", 28th Digital Avionics Systems Conference, Oct. 25-29, 2009, IEEE, pp. 1-13.
Manzi et al., "Wide Scale CTA Flight Trials at Stockholm Arlanda Airport", 28th Digital Avionics Systems Conference, Oct. 25-29, 2009, IEEE, pp. 1-13.
Aeronautical Information Services—Aeronautical Information Management Study Group (AIS-AIMSG), Second Meeting, Montreal, Nov. 10-13, 2009, pp. 1-3.

(Continued)

*Primary Examiner* — Hiep V Nguyen
(74) *Attorney, Agent, or Firm* — Yee & Associates, P.C.

(57) ABSTRACT

The different advantageous embodiments provide a system comprising a computer, first program code stored on the computer, and second program code stored on the computer. The computer is configured to run the first program code to retrieve flight status information during a flight and generate four dimensional flight information. The four dimensional flight information includes a comparison of the flight status information to a flight plan for the flight. The computer is configured to run the second program code to depict the four dimensional flight information in a textual format.

16 Claims, 7 Drawing Sheets

(56) References Cited

OTHER PUBLICATIONS

Sesar Factsheet, Today's Partners for Tomorrow's Aviation, No. 2, 2010, pp. 1-3 www.sesarju.eu.
Office Action, dated Aug. 14, 2013, regarding U.S. Appl. No. 13/540,385, 16 pages.
Notice of allowance dated Nov. 15, 2012 regarding U.S. Appl. No. 12/781,548, 16 pages.
Preliminary Amendment dated Jul. 2, 2012 regarding U.S. Appl. No. 13/540,385, 4 pages.
Pschierer, "Graphical Depiction of Four Dimensional Trajectory Based Operation Flight Plans", U.S. Appl. No. 13/540,385, filed Jul. 2, 2012, 49 pages.
Notice of Allowance, dated Dec. 27, 2014, regarding U.S. Appl. No. 13/540,385, 6 pages.

* cited by examiner

TABULAR INFORMATION
DISPLAY
700

| Ident | FLIGHT LEVEL 702 | TRUE AIRSPEED 704 | GROUND SPEED 706 | MAGNETIC COURSE 708 | DISTANCE TO WAYPOINT 710 | REQUIRED TIME OF ARRIVAL 712 | ESTIMATED TIME OF ARRIVAL 714 |
|---|---|---|---|---|---|---|---|
| KSFO | 0 | 0 | 0 | 0 | 0 | 12:00 | |
| LIN | 0 | 0 | 0 | 50.2 | 71 | 12:00 | 01:16 |
| PEONS | 410 | 475 | 486 | 57.9 | 72 | 01:10 --15 | 01:25 |
| INSLO | 410 | 476 | 503 | 69.6 | 89 | 01:20 --15 | 01:35 |
| DTA | 410 | 477 | 496 | 65.7 | 227 | 01:48 --15 | 02:03 |
| MTU | 410 | 476 | 488 | 50.2 | 121 | 02:03 --15 | 02:18 |
| CYS | 410 | 475 | 482 | 61.9 | 253 | 02:34 --15 | 02:49 |
| HANKI | 410 | 474 | 486 | 62.6 | 87 | 02:45 --15 | 03:00 |
| ONL | 410 | 472 | 487 | 66.1 | 196 | 03:09 --15 | 03:24 |
| GOOLD | 410 | 471 | 485 | 74.3 | 178 | 03:31 --15 | 03:46 |
| MCW | 410 | 471 | 484 | 78.1 | 61 | 03:39 --15 | 03:54 |
| SUZYQ | 410 | 472 | 486 | 92.2 | 51 | 03:45 --15 | 04:00 |
| VIKNG | 410 | 472 | 487 | 95.9 | 28 | 03:48 --15 | 04:03 |
| LARVA | 410 | 472 | 488 | 97.4 | 44 | 03:54 --15 | 04:09 |
| JIBOR | 410 | 473 | 490 | 98.2 | 20 | 03:56 --15 | 04:11 |
| BRIBE | 410 | 473 | 489 | 111.1 | 8 | 03:57 --15 | 04:12 |
| MYTCH | 0 | 0 | 0 | 113 | 9 | 12:00 | |
| JVL | 0 | 0 | 0 | 110.6 | 30 | 12:00 | |
| BULLZ | 0 | 0 | 0 | 111.8 | 16 | 12:00 | |
| TEDDY | 0 | 0 | 0 | 115.1 | 6 | 12:00 | |
| KRENA | 0 | 0 | 0 | 115.2 | 7 | 12:00 | |
| ORD | 0 | 0 | 0 | 131.5 | 35 | 12:00 | |
| KORD | 0 | 0 | 0 | 191.1 | 0 | 12:00 | |

*FIG. 7*

| Ident | FLIGHT LEVEL 802 | TRUE AIRSPEED 804 | GROUND SPEED 806 | MAGNETIC COURSE 808 | DISTANCE TO WAYPOINT 810 | REQUIRED TIME OF ARRIVAL 812 | ESTIMATED TIME OF ARRIVAL 814 | WIND DIRECTION 816 | WIND SPEED 818 |
|---|---|---|---|---|---|---|---|---|---|
| KSFO | 0 | 0 | 0 | 0 | 0 | 12:00 | | 0 | 0 |
| LIN | 0 | 0 | 0 | 50.2 | 71 | 12:00 | | 0 | 0 |
| PEONS | 410 | 475 | 486 | 57.9 | 72 | 05:05 | 05:05 | 40 | 36 |
| INSLO | 410 | 476 | 503 | 69.6 | 89 | 05:15 | 05:15 | 10 | 31 |
| DTA | 410 | 477 | 596 | 65.7 | 227 | +4 05:43 | 05:38 | 330 | 120 |
| MTU | 410 | 476 | 566 | 50.2 | 121 | +6 05:58 | 05:51 | 270 | 140 |
| CYS | 410 | 475 | 528 | 61.9 | 253 | +9 06:29 | 06:20 | 260 | 170 |
| HANKI | 410 | 474 | 538 | 62.6 | 87 | +10 06:40 | 06:29 | 270 | 140 |
| ONL | 410 | 472 | 487 | 66.1 | 196 | +10 07:04 | 06:54 | 280 | 27 |
| GOOLD | 410 | 471 | 557 | 74.3 | 178 | +13 07:26 | 07:13 | 300 | 120 |
| MCW | 410 | 471 | 550 | 78.1 | 61 | +14 07:34 | 07:19 | 320 | 90 |
| SUZYQ | 410 | 472 | 486 | 92.2 | 51 | +14 07:40 | 07:26 | 330 | 16 |
| VIKNG | 410 | 472 | 487 | 95.9 | 28 | +14 07:43 | 07:29 | 340 | 17 |
| LARVA | 410 | 472 | 488 | 97.4 | 44 | +14 07:49 | 07:35 | 350 | 17 |
| JIBOR | 410 | 473 | 490 | 98.2 | 20 | +14 07:51 | 07:37 | 360 | 17 |
| BRIBE | 410 | 473 | 489 | 111.1 | 8 | +14 07:52 | 07:38 | 360 | 17 |
| MYTCH | 0 | 0 | 0 | 113 | 9 | 12:00 | | 0 | 0 |
| JVL | 0 | 0 | 0 | 110.6 | 30 | 12:00 | | 0 | 0 |
| BULLZ | 0 | 0 | 0 | 111.8 | 16 | 12:00 | | 0 | 0 |
| TEDDY | 0 | 0 | 0 | 115.1 | 6 | 12:00 | | 0 | 0 |
| KRENA | 0 | 0 | 0 | 115.2 | 7 | 12:00 | | 0 | 0 |
| ORD | 0 | 0 | 0 | 131.5 | 35 | 12:00 | | 0 | 0 |
| KORD | 0 | 0 | 0 | 191.1 | 0 | 12:00 | | 0 | 0 |

TABULAR INFORMATION DISPLAY 800

*FIG. 8*

FOUR DIMENSIONAL TRAJECTORY BASED OPERATION FLIGHT PLANS

CROSS REFERENCE TO RELATED APPLICATIONS

This application is related to commonly assigned and co-pending U.S. patent application Ser. No. 12/781,548 entitled "Graphical Depiction of Four Dimensional Trajectory Based Operation Flight Plans" filed on May 17, 2010, issued as U.S. Pat. No. 8,396,614 on Mar. 12, 2013, all of which are hereby incorporated by reference.

BACKGROUND INFORMATION

1. Field

The present disclosure relates generally to aircraft and, in particular, to a method and system for depicting flight plan information. Still more particularly, the present disclosure provides a method and system for collecting and depicting important information about current flight plan status during flight.

2. Background

Aircraft generally travel from one airport to another airport using a pre-determined flight plan. Flight plans are generated in advance of a flight, and account for expected weather conditions and air traffic for a particular route. Aircraft use these flight plans to navigate between airports and maintain a desired course of trajectory.

Aircraft flight management systems rely on flight plans for route and destination information. These flight plans are pre-defined and preloaded before a flight into the flight management system. The flight management system is implemented in a flight deck computer of the aircraft. A flight plan will include a required time of arrival for the aircraft at waypoints along the route and the destination.

During flight, an aircraft may encounter a number of conditions that affect the travel time of the aircraft. For example, wind conditions may affect the speed of an aircraft. When a condition affects the travel time of the aircraft, a required time of arrival at a particular waypoint or destination may no longer be met by the aircraft. This results in air traffic delays that are often not realized until the aircraft has reached its destination.

Current flight plans primarily rely on defined airways and navigation waypoints, but air traffic management is moving towards a "free flight" mode that is not limited to fixed airways. To ensure sufficient separation between aircraft in this environment flight plans will become four dimensional (4D) paths. Timing along the route is not as important as arrival time at a destination waypoint with traditional flight paths, but a 4D flight plan requires accurate timing all along the flight path to maintain airspace separation. Current systems are not designed to readily provide situational awareness of actual flight path as compared to a 4D flight plan. It is also important to update 4D flight plans during flight and quickly provide updated situational information to pilots.

Therefore, it would be advantageous to have a method and apparatus that addresses one or more of the issues discussed above.

SUMMARY

The different advantageous embodiments provide a system comprising a computer, first program code stored on the computer, and second program code stored on the computer. The computer is configured to run the first program code to retrieve flight status information during a flight and generate four dimensional flight information. The four dimensional flight information includes a comparison of the flight status information to a flight plan for the flight. The computer is configured to run the second program code to depict the four dimensional flight information in a textual format.

The different advantageous embodiments further provide a method for four dimensional textual display. A flight plan for a flight is received. The flight is initiated using the flight plan. Flight status information is continually retrieved during the flight. A number of estimated times of arrival is calculated using the flight status information retrieved. The flight status information and the number of estimated times of arrival are integrated into 4D flight information. The four dimensional flight information includes a comparison of the flight status information to a flight plan for the flight.

The different advantageous embodiments further provide a computer program product for managing information for flights comprising a computer recordable storage medium and program code stored on the computer recordable storage medium. The program code receives a flight plan for a flight, initiates the flight using the flight plan, continually retrieves flight status information during the flight, calculates a number of estimated times of arrival using the flight status information retrieved, and integrates the flight status information and the number of estimated times of arrival into 4D flight information. The four dimensional flight information includes a comparison of the flight status information to a flight plan for the flight.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 7 is an illustration of a tabular information display in accordance with an advantageous embodiment;

FIG. 8 is an illustration of a tabular information display in accordance with an advantageous embodiment.

DETAILED DESCRIPTION

Figure 1:
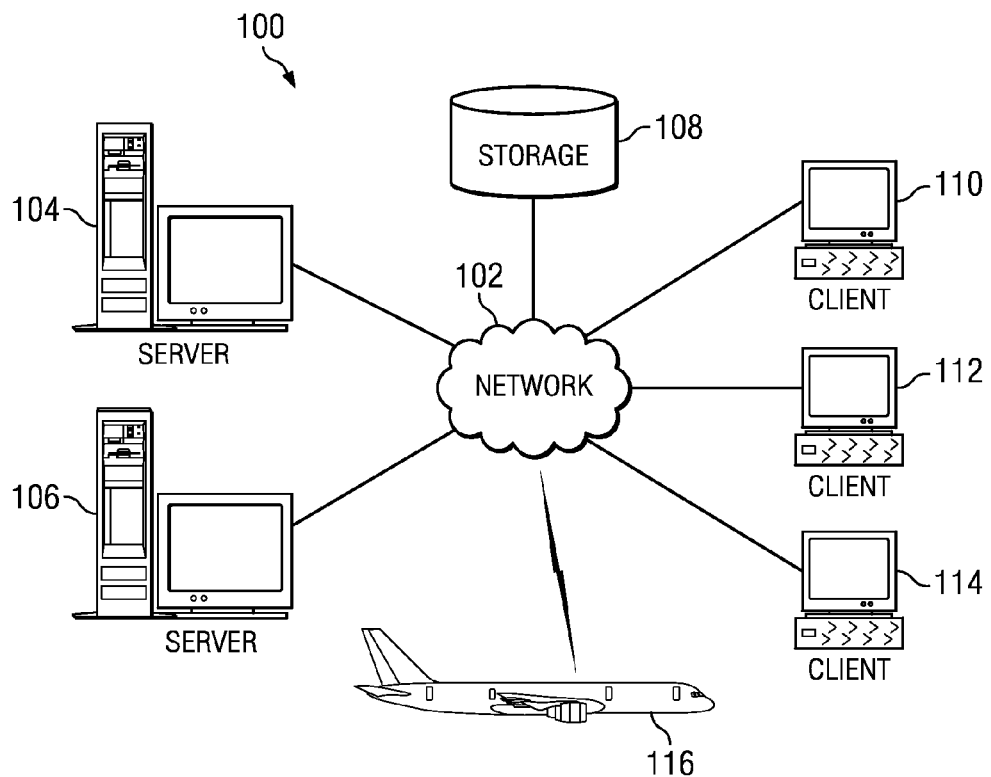
FIG. 1 is an illustration of a network of data processing systems in which an advantageous embodiment may be implemented.
Figure 2:
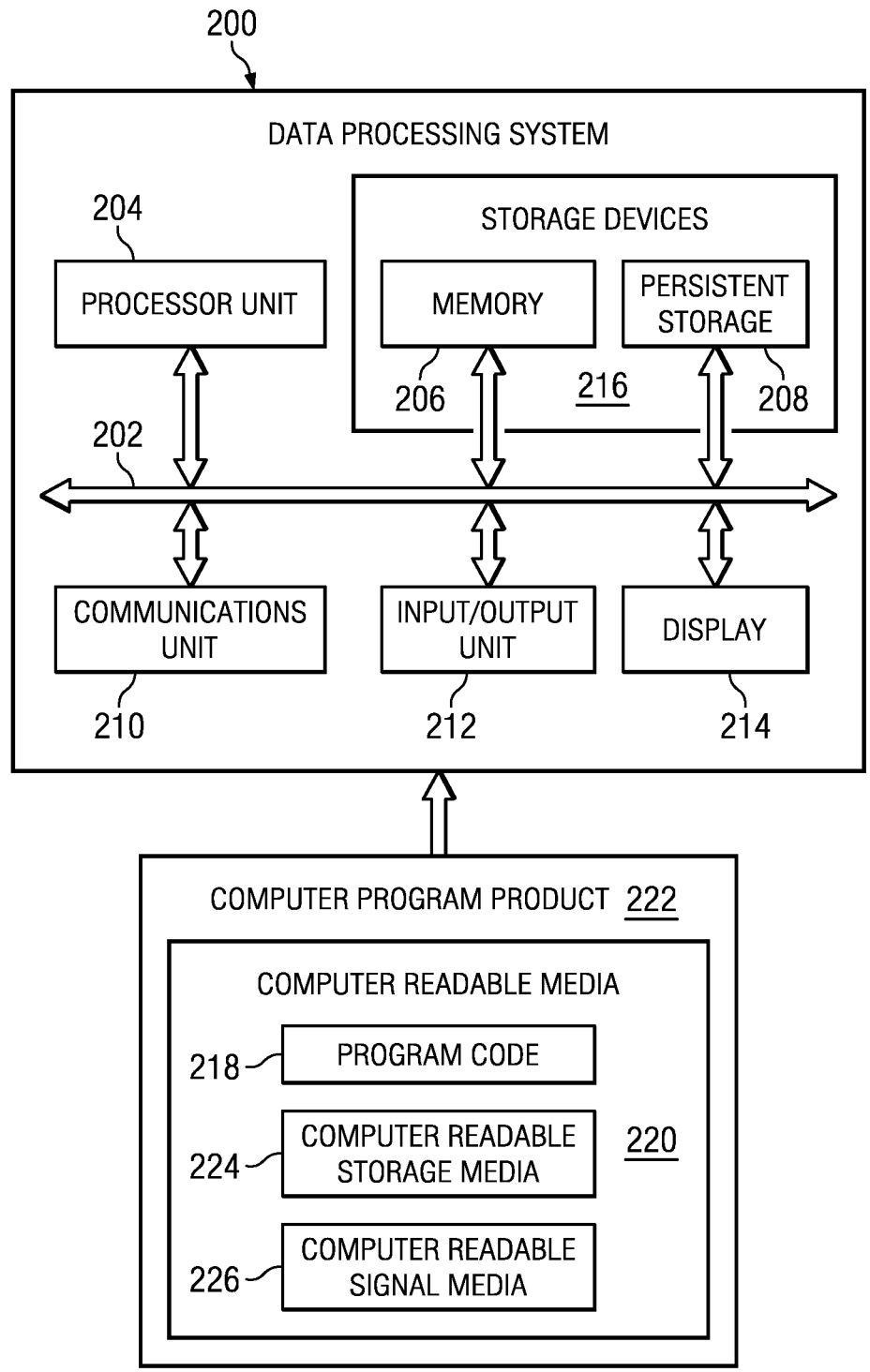
FIG. 2 is an illustration of a data processing system in accordance with an advantageous embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. For example, aircraft 116 may exchange four dimensional information with servers 104 and 106, in an advantageous embodiment. Four dimensional (4D) information includes latitude, longitude, altitude, and time. In one advantageous embodiment, 4D information may consist of latitude, longitude, altitude, and time for waypoints along the route of a flight, for example.

Aircraft 116 may exchange data with different computers through a wireless communications link while in-flight or through any other type of communications link while on the ground. In these examples, server 104, server 106, client 110, client 112, and client 114 may be computers. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a block diagram of a data processing system is depicted in accordance with an advantageous embodiment. Data processing system 200 is an example of a data processing system that may be used to implement servers and clients, such as server 104 and client 110. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The different advantageous embodiments recognize and take into account that current flight management systems display en-route and terminal charts associated with a flight plan using static information, or information that was predefined and preloaded well before the flight. When conditions during flight affect the travel time of the aircraft, the information depicting route information may become less relevant.

Thus, the different advantageous embodiments provide a system comprising a computer, first program code stored on the computer, and second program code stored on the computer. The computer is configured to run the first program code to retrieve flight status information during a flight and generate four dimensional flight information. The four dimensional flight information includes a comparison of the flight status information to a flight plan for the flight. The computer is configured to run the second program code to depict the four dimensional flight information in a textual format.

The different advantageous embodiments further provide a method for four dimensional textual display. A flight plan for a flight is received. The flight is initiated using the flight plan. Flight status information is continually retrieved during the flight. A number of estimated times of arrival is calculated using the flight status information retrieved. The flight status information and the number of estimated times of arrival are integrated into 4D flight information. The four dimensional flight information includes a comparison of the flight status information to a flight plan for the flight.

The different advantageous embodiments further provide a computer program product for managing information for flights comprising a computer recordable storage medium and program code stored on the computer recordable storage medium. The program code receives a flight plan for a flight, initiates the flight using the flight plan, continually retrieves flight status information during the flight, calculates a number of estimated times of arrival using the flight status information retrieved, and integrates the flight status information and the number of estimated times of arrival into 4D flight information. The four dimensional flight information includes a comparison of the flight status information to a flight plan for the flight.

Figure 3:
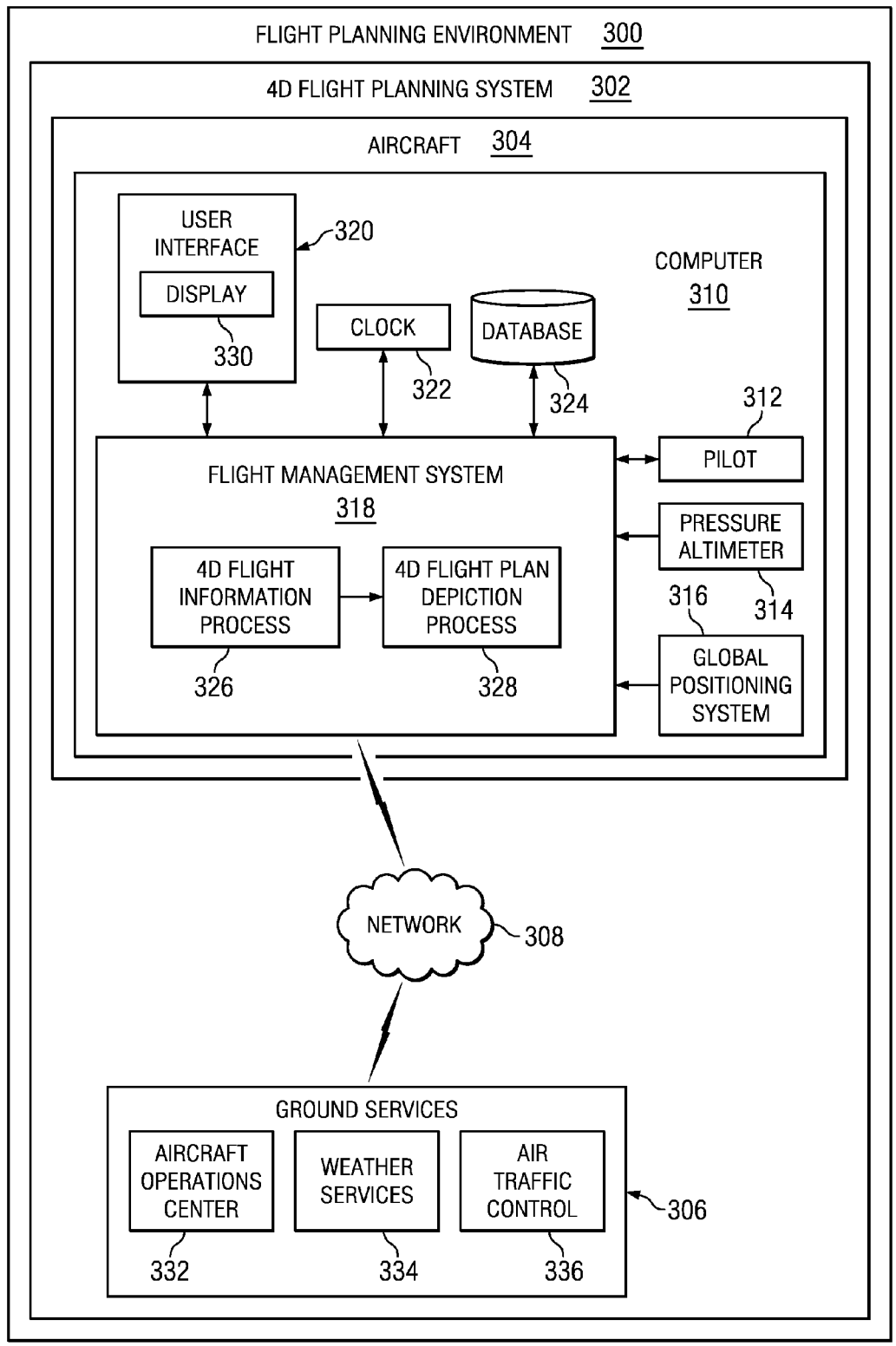
FIG. 3 is an illustration of a flight planning environment in accordance with an advantageous embodiment.

With reference now to FIG. 3, an illustration of a flight planning environment is depicted in accordance with an advantageous embodiment. Flight planning environment 300 may be implemented in a network environment, such as network data processing system 100 in FIG. 1, for example.

Flight planning environment 300 may be any type of environment suitable for generating, updating, accepting, and/or approving flight plans for aircraft, for example. Flight planning environment 300 includes four dimensional (4D) flight planning system 302. 4D flight planning system 302 is configured to receive, manage, and depict four dimensional information about a number of flight plans, a number of flight routes, and a number of aircraft.

4D flight planning system 302 provides real-time or near real-time feedback to an aircraft operator about the position and timing of the aircraft compared to the flight plan and required times of arrival. 4D flight planning system 302 uses information received during flight to build flight context sensitive four dimensional information about aircraft position and timing, and compares that four dimensional information to expected or required position and timing information provided by a four dimensional flight plan, for example. 4D flight planning system 302 may continually receive flight information and recalculate the four dimensional information during flight to provide up-to-date contextual information for a flight.

4D flight planning system 302 includes aircraft 304, ground services 306, and network 308, in this illustrative example. Aircraft 304 may be an illustrative example of one implementation of aircraft 116 in FIG. 1. Aircraft 304 and ground services 306 communicate using network 308. Network 308 is an illustrative example of one implementation of network 102 in FIG. 1.

Aircraft 304 may include computer 310, pilot 312, pressure altimeter 314, and global positioning system 316 among other components. Computer 310 may be an aircraft data processing system of the aircraft flight deck, an electronic flight bag, and/or any other suitable aircraft computer. Computer 310 includes flight management system 318, user interface 320, clock 322, and database 324. Flight management system 318 is a system that automates a number of in-flight tasks, such as navigation and flight plan management. Flight management system 318 receives flight plans and associated information for a flight. Associated information may include information such as, without limitation, en-route charts, terminal charts, a number of waypoints, a destination, required times of arrival, and/or any other suitable information, for example. Flight management system 318 uses the flight plans and associated information to provide navigational information and navigational aid to pilot 312.

In these illustrative examples, flight management system 318 includes four dimensional (4D) information process 326 and four dimensional (4D) flight plan depiction process 328. 4D information process 326 collects information about the context of a flight and a flight plan for aircraft 304 and integrates the information for use by 4D flight plan depiction process 328. Information about the context of a flight may include, for example, without limitation, current aircraft position, current aircraft altitude, current time, current weather conditions in an environment around aircraft 304, and/or any other suitable information about the context of a flight. Information about a flight plan may include, for example, without limitation, route information, a number of waypoints, required time of arrival for each of the number of waypoints and a destination, forecasted weather for the flight route, and/or any other suitable flight plan information. 4D flight plan depiction process 328 uses integrated information collected by 4D information process 326 to generate a 4D information display for pilot 312. 4D flight plan depiction process 328 may display the information using display 330 of user interface 320, for example. In an illustrative example, the 4D information display is implemented as a textual format. In another illustrative example, the 4D information display is implemented as a tabular format.

Pilot 312 may be a human aircraft operator, for example. Pressure altimeter 314 measures the altitude of aircraft 304 and sends altitude information to flight management system 318. Global positioning system 316 determines position information for aircraft 304 and sends position information to flight management system 318. Database 324 may include flight plan information, weather forecasts, and other route information used by flight management system 318 for navigation and flight plan management.

Ground services 306 may include aircraft operations center 332, weather services 334, air traffic control 336, and/or any other suitable service. Aircraft operations center 332 generates four dimensional flight plans for use by aircraft 304, for example. Weather services 334 provides weather forecasts and up-to-date weather information to aircraft 304 over network 308. Air traffic control 336 receives flight plans accepted by aircraft 304 and uses the flight plans to send instructions to aircraft 304.

In an illustrative example, aircraft operations center 332 may send an initial flight plan to flight management system 318 for aircraft 304. During flight, weather services 334 may send updated weather forecasts for the route aircraft 304 is flying according to the flight plan. 4D flight information process 326 may use this information to calculate a new estimated time of arrival, which may result in a variance between the estimated time of arrival and the required time of arrival. Flight management system 318 may display 4D flight information to pilot 312, including the variance between the estimated time of arrival and the required time of arrival, using 4D flight plan depiction process 328. This display prompts pilot 312 to send a message through flight management system 318 to aircraft operations center 332 requesting an updated flight plan based on the new estimated time of arrival. Aircraft operations center 332 generates a new flight plan and sends it back to flight management system 318. Pilot 312 may view the new flight plan using user interface 320 and accept or reject the flight plan. If pilot 312 accepts the new flight plan, flight management system 318 updates air traffic control 336 with the new flight plan for aircraft 304, in this illustrative example.

The illustration of flight planning environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
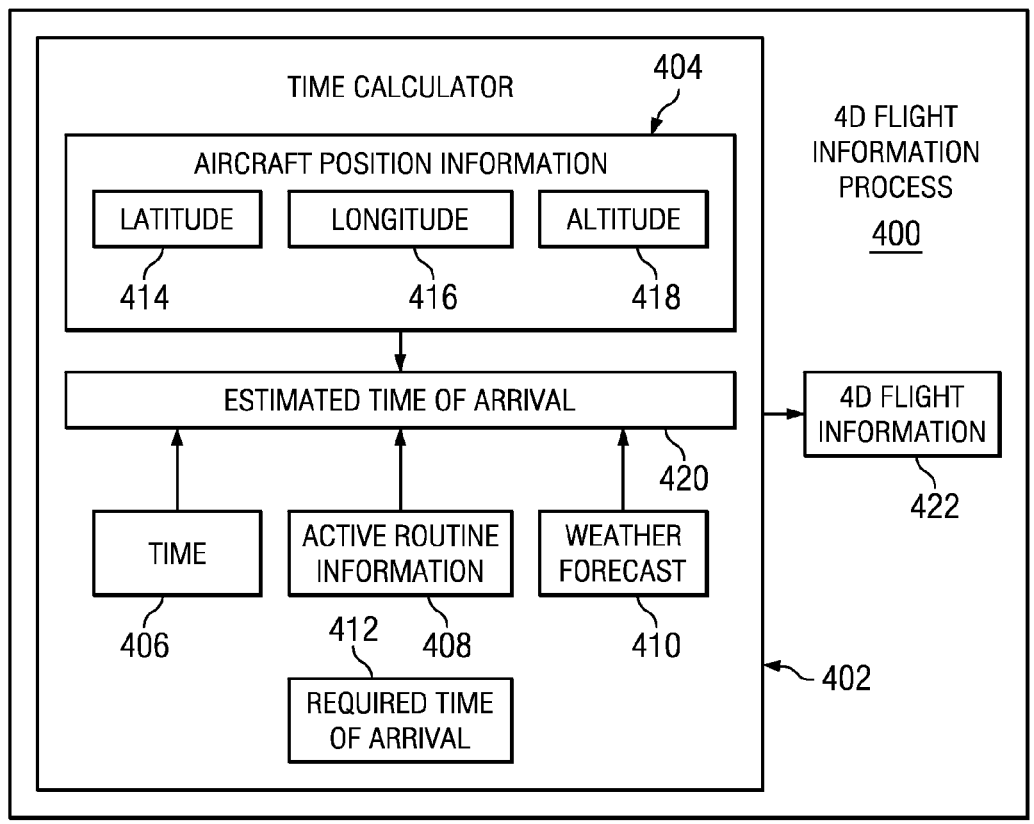
FIG. 4 is an illustration of a 4D flight information process in accordance with an advantageous embodiment.

With reference now to FIG. 4, an illustration of a 4D flight information process is depicted in accordance with an advantageous embodiment. 4D flight information process 400 is an illustrative example of 4D flight information process 326 in FIG. 3.

4D flight information process 400 includes time calculator 402. Time calculator 402 collects information about a flight and a flight plan to generate an estimated time of arrival for an aircraft at a number of waypoints or destination. Time calculator 402 receives aircraft position information 404, time 406, active route information 408, weather forecast 410, and required time of arrival 412. Aircraft position information 404 may include, without limitation, latitude 414, longitude 416, and altitude 418. Latitude 414 and longitude 416 may be received from global positioning system 316 in FIG. 3, for example. Altitude 418 may be received from pressure altimeter 314 in FIG. 3, for example.

Time 406 may be retrieved from clock 322 in FIG. 3. Active route information 408 may be retrieved from database 324 in FIG. 3 and/or from ground services 306 over network 308 in FIG. 3. Active route information may include a current flight plan, a number of waypoints associated with the current flight plan, a destination associated with the current flight plan, and/or any other suitable information about an active route for an aircraft associated with 4D flight information process 400.

Weather forecast 410 may be received from weather services 334 over network 308 in FIG. 3 and/or using a number of sensor systems of an aircraft associated with 4D flight information process 400, for example. Required time of arrival 412 may be retrieved from database 324 in FIG. 3 and/or from ground services 306 over network 308 in FIG. 3. Required time of arrival 412 is associated with the current flight plan of an aircraft.

Time calculator 402 uses the information received and/or retrieved from a number of different sources to calculate estimated time of arrival 420. Estimated time of arrival 420 may be calculated for a waypoint in a number of waypoints and/or a destination associated with a current flight plan, for example. 4D flight information process 400 uses the information received and/or retrieved, along with the estimated time of arrival calculated, to generate 4D flight information 422. 4D flight information 422 is information about the current status of a flight that includes latitude, longitude, altitude, and time information, along with other information in comparison with a four dimensional flight plan.

4D flight information process 400 may send 4D flight information 422 to a 4D flight plan depiction process, such as 4D flight plan depiction process 328 in FIG. 3, for 4D display to a pilot, such as pilot 312 in FIG. 3. 4D flight information 422 enhances situational awareness in a context sensitive manner specific to a particular aircraft, for example.

The illustration of 4D flight information process 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
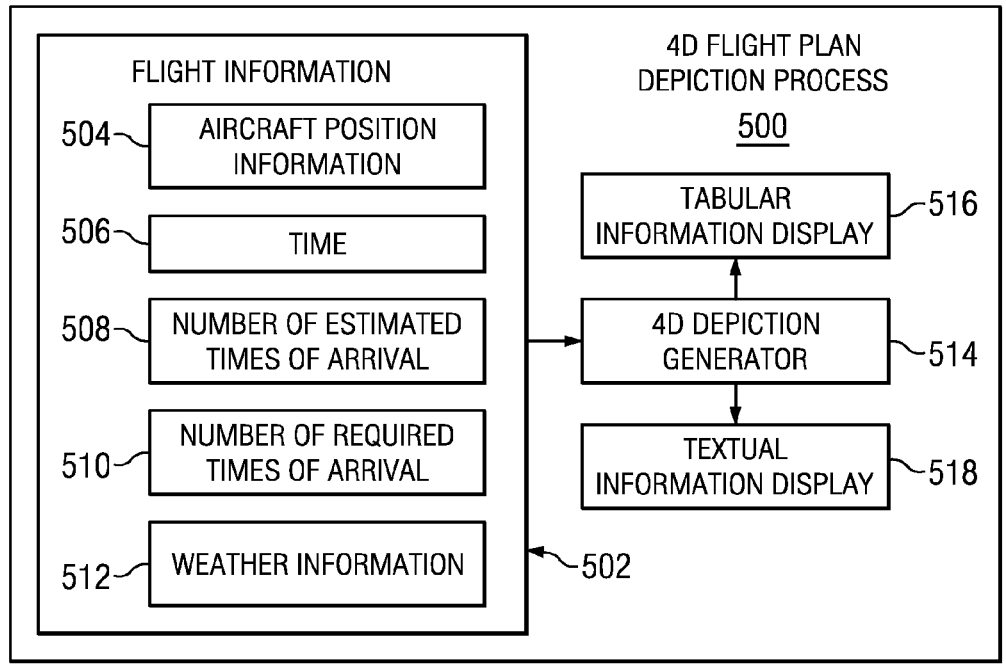
FIG. 5 is an illustration of a 4D flight plan depiction process in accordance with an advantageous embodiment.

With reference now to FIG. 5, an illustration of a 4D flight plan depiction process is depicted in accordance with an advantageous embodiment. 4D flight plan depiction process 500 is an illustrative example of 4D flight plan depiction process 328 in FIG. 3.

4D flight plan depiction process 500 receives flight information 502 from a 4D flight information process, such as 4D flight information process 326 in FIG. 3 and/or 4D flight information process 400 in FIG. 4. Flight information 502 may be an illustrative example of one implementation of 4D flight information 422 in FIG. 4.

Flight information 502 may include, for example, without limitation, aircraft position information 504, time 506, number of estimated times of arrival 508, number of required times of arrival 510, and weather information 512. Aircraft position information 504 may be, for example, without limitation, latitude, longitude, and altitude. Number of estimated times of arrival 508 may be associated with a number of waypoints and/or a destination for a flight plan associated with flight information 502, for example. Likewise, number of required times of arrival 510 may be associated with a number of waypoints and/or a destination for a flight plan associated with flight information 502, for example.

4D flight plan depiction process 500 includes 4D depiction generator 514. 4D depiction generator 514 uses flight information 502 to generate tabular information display 516 and/or textual information display 518. Textual information display 518 is a visual depiction of flight information 502 in a textual format. Tabular information display 516 is a visual depiction of textual four dimensional flight information in a table format for display over a user interface, such as user interface 320 in FIG. 3. Tabular information display 516 and/or textual information display 518 may depict a comparison of current flight status information against expected flight plan information, providing flight context sensitive feedback to a pilot, such as pilot 312 in FIG. 3.

The illustration of 4D flight plan depiction process 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
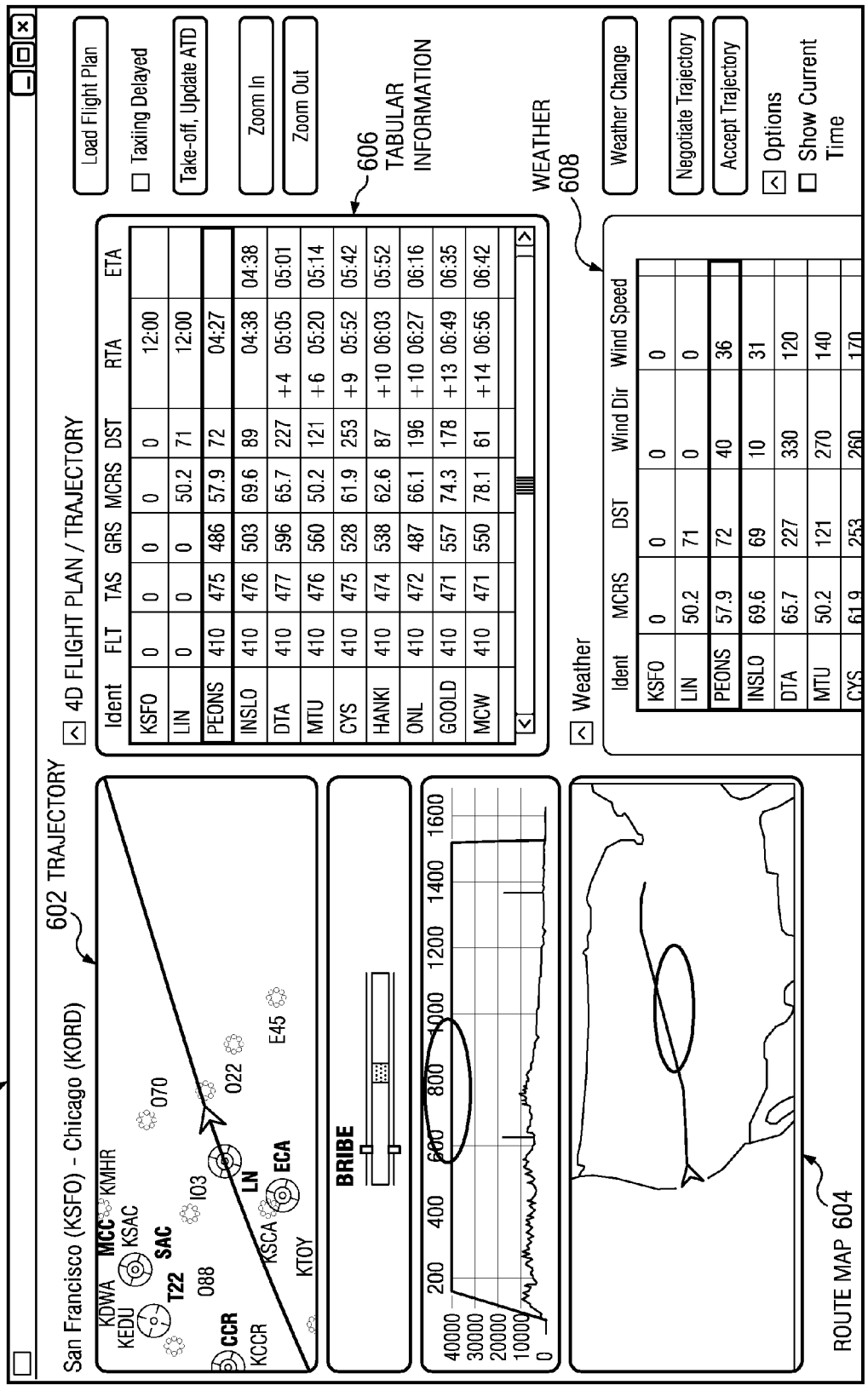
FIG. 6 is an illustration of a 4D display in accordance with an advantageous embodiment.

With reference now to FIG. 6, an illustration of a 4D display is depicted in accordance with an advantageous embodiment. 4D display 600 is an illustrative example of one implementation of tabular information display 516 in FIG. 5 using user interface 320 in FIG. 3.

4D display 600 depicts trajectory 602, route map 604, tabular information 606, and weather 608. Trajectory 602 may show a portion of the flight plan for an aircraft, such as aircraft 304 in FIG. 3, for example. Route map 604 may show an overview of the route associated with the flight plan, for example. Tabular information 606 provides four dimensional flight information associated with trajectory 602 and route map 604. Tabular information 606 may include information such as flight level, true airspeed, ground speed, magnetic course, distance to a waypoint, required time of arrival, estimated time of arrival, wind direction, wind speed, and/or any other suitable information. Weather 608 may display current weather received from weather services 334 over network 308 in FIG. 3 and/or sensor systems of an aircraft associated with 4D display 600, for example.

The illustration of 4D display 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 7, an illustration of a tabular information display is depicted in accordance with an advantageous embodiment. Tabular information display 700 may be an illustrative example of one implementation of tabular information display 516 in FIG. 5.

Tabular information display 700 includes information associated with flight level 702, true airspeed 704, ground speed 706, magnetic course 708, distance to waypoint 710, required time of arrival 712, and estimated time of arrival 714, in this illustrative example.

The illustration of tabular information display 700 in FIG. 7 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 8, an illustration of a tabular information display is depicted in accordance with an advantageous embodiment. Tabular information display 800 may be an illustrative example of one implementation of tabular information display 516 in FIG. 5.

Tabular information display 800 includes information associated with flight level 802, true airspeed 804, ground speed 806, magnetic course 808, distance to waypoint 810, required time of arrival 812, estimated time of arrival 814, wind direction 816, and wind speed 818 in this illustrative example.

The illustration of tabular information display 800 in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
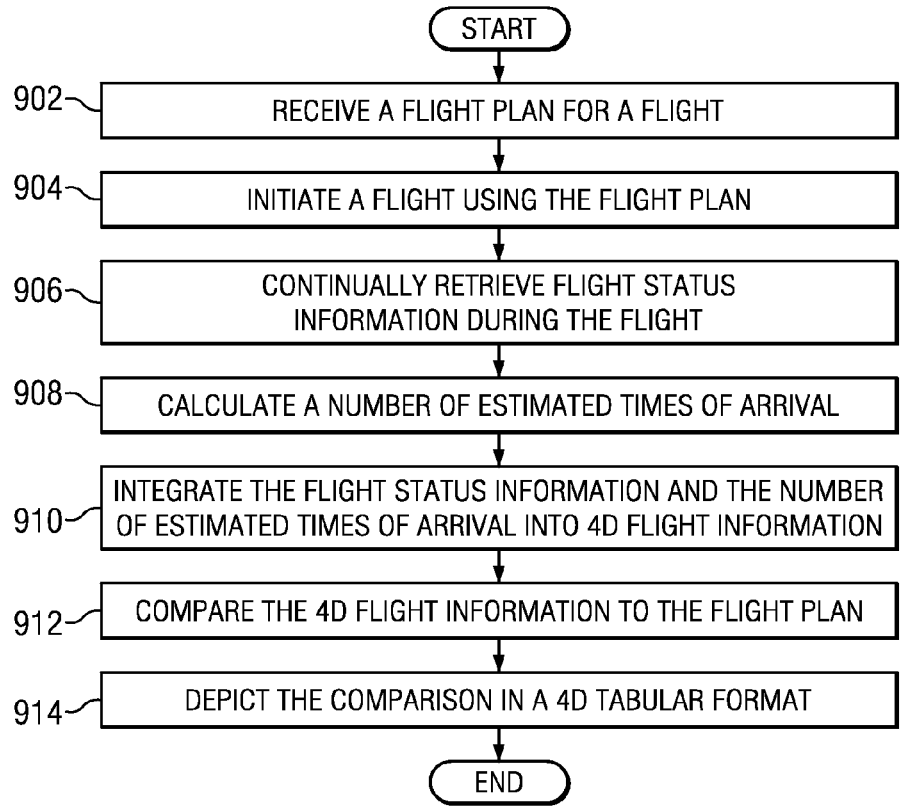
FIG. 9 is an illustration of a flowchart illustrating a process for 4D tabular display in accordance with an advantageous embodiment.

With reference now to FIG. 9, an illustration of a flowchart illustrating a process for 4D tabular display is depicted in accordance with an advantageous embodiment. The process in FIG. 9 may be implemented by a component such as 4D flight planning system 302 in FIG. 3, for example.

The process begins by receiving a flight plan for a flight (operation 902). The flight plan may be received prior to flight from an aircraft operations center, such as aircraft operations center 332 in FIG. 3, for example. The flight plan may include en-route charts, terminal charts, required times of arrival, waypoints, and a destination, for example.

The process initiates a flight using the flight plan (operation 904). The flight may be initiated by an aircraft using a flight management system, such as aircraft 304 in FIG. 3, for example. The process continually retrieves flight status information during the flight (operation 906). The flight status information may include, for example, without limitation, aircraft position information, time, weather information, and/or any other suitable information. The process may retrieve flight status information repetitively in a given time increment, as often as the flight management system can retrieve and assimilate the information, and/or in any other suitable continual manner.

The process calculates a number of estimated times of arrival (operation 908). The number of estimated times of arrival may correspond to one or more waypoint or destinations associated with the flight plan. The estimated times of arrival are based on the flight status information retrieved, rather than the static flight plan information. The process may use a time calculator, such as time calculator 402 in FIG. 4, to calculate the number of estimated times of arrival, for example.

The process integrates the flight status information and the number of estimated times of arrival into 4D flight information (operation 910). The 4D flight information includes aircraft latitude, longitude, and altitude along with the current time, for example. The process then compares the 4D flight information to the flight plan (operation 912). In an illustrative example, the process may compare an estimated time of arrival at a particular waypoint with the required time of arrival for the particular waypoint to determine whether a difference or variance exists between the information.

The process depicts the comparison in a 4D tabular format (operation 914), with the process terminating thereafter. The 4D tabular format may be, for example, tabular information display 700 in FIG. 7.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account that current flight management systems display en-route and terminal charts associated with a flight plan using static information, or information that was predefined and preloaded well before the flight. When conditions during flight affect the travel time of the aircraft, the information depicting route information may become less reliable.

Thus, the different advantageous embodiments provide a system for depicting both time and altitude data in real-time to provide enhanced situational awareness in four dimensional trajectory based operation flight plans. The four dimensional flight information generated is data driven and context sensitive to the specific timing and trajectory of the aircraft. This system provides a dynamic display of the current aircraft status in comparison to the expected or required status of the flight plan.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
    a computer;
    a first program code stored on the computer, the computer configured to: run the first program code to continually retrieve flight status information during a flight, such that flight status comprises an estimated time of arrival at each remaining waypoint in a flight plan for the flight, and generate four dimensional flight information, such that the four dimensional flight information comprises: a required time of arrival, the estimated time of arrival, and a comparison of the flight status information to the flight plan for the flight, such that the comparison of the flight status information comprises a numerical time difference between the estimated time of arrival at each remaining waypoint in the flight plan for the flight and the required time of arrival at each remaining waypoint in the flight plan for the flight, respectively;
    a second program code stored on the computer, such that the computer is configured to run the second program code to depict the four dimensional flight information in a textual format; and
    a third program code stored on the computer and configured, when a deviation of the estimated time of arrival at a particular point from the required time of arrival for the particular point becomes greater than a specified value, to generate a new four-dimensional flight plan and transmit an air traffic control clearance request, such that the new four-dimensional flight plan changes the deviation to the specified value or lower, wherein the flight status information includes at least one of aircraft position information, time, and weather information.

2. The system of claim 1, wherein the four dimensional flight information includes aircraft latitude, longitude, altitude and a current time associated with the latitude, the longitude, and the altitude.

3. The system of claim 1, wherein the flight plan is a four dimensional flight plan for the flight.

4. The system of claim 1, wherein the computer is further configured to run the second program code to depict the four dimensional flight information in a tabular format.

5. The system of claim 1, such that the computer is configured to run the second program code to depict, using a flight management system, the four dimensional flight information in the textual format.

6. The system of claim 1, such that the first program code is implemented as part of a network environment.

7. The system of claim 1, such that the flight plan comprises at least one of: waypoints, information about a route, a destination, and weather information for the route.

8. A method for four dimensional textual display, the method comprising:
    receiving, by a computer, a flight plan for a flight;
    initiating the flight using the flight plan;
    continually retrieving, by the computer, flight status information during the flight;
    calculating, by the computer, an estimated time of arrival for each remaining waypoint on the flight plan, using the flight status information retrieved;
    integrating, by the computer, the flight status information and the estimated time of arrival for each remaining waypoint on the flight plan, into four dimensional flight information, such that the four dimensional flight information includes a comparison of the flight status information to the flight plan for the flight, such that the comparison of the flight status information comprises a numerical time difference between the estimated time of arrival at each remaining waypoint on the flight plan, and a required time of arrival at each remaining waypoint on the flight plan, respectively;
    depicting, in a textual format on a display, the estimated time of arrival at each remaining waypoint on the flight plan and the comparison of the flight status information to the flight plan for the flight; and
    the computer, when a deviation of the estimated time of arrival at a particular point from the required time of arrival for the particular point becomes greater than a specified value, generating a new four-dimensional flight plan and transmitting an air traffic control clearance request, such that the new four-dimensional flight plan changes the deviation to the specified value or lower, wherein the flight status information includes at least one of aircraft position information, time, and weather information.

9. The method of claim 8 further comprising:
    depicting the comparison in a four dimensional tabular format using the display.

10. The method of claim 8, wherein the four dimensional flight information includes aircraft latitude, longitude, altitude and a current time associated with the latitude, the longitude, and the altitude.

11. The method of claim 8, such that depicting, in the textual format on the display, uses a flight management system.

12. A computer program product for managing information used to operate an aircraft in flight, the computer program product comprising:

a tangible computer recordable non-transitory storage medium;

a program code, stored on the computer recordable non-transitory storage medium, configured to receive a flight plan for the flight;

the program code, stored on the computer recordable non-transitory storage medium, configured to initiate the flight using the flight plan;

the program code, stored on the computer recordable non-transitory storage medium, configured to continually retrieve flight status information during the flight;

the program code, stored on the computer recordable non-transitory storage medium, configured to calculate an estimated time of arrival for each remaining waypoint on the flight plan, using the flight status information retrieved;

the program code, stored on the computer recordable non-transitory storage medium, configured to integrate the flight status information and the estimated time of arrival for each remaining waypoint on the flight plan, into four dimensional flight information, such that the four dimensional flight information includes a comparison of the flight status information to the flight plan for the flight, such that the comparison of the flight status information comprises a numerical time difference between the estimated times of arrival at each remaining waypoint on the flight plan and a required time of arrival at each remaining waypoint on the flight plan, respectively;

the program code, stored on the computer recordable non-transitory storage medium, for depicting, in a textual format on a display, the estimated time of arrival at each remaining waypoint on the flight plan and the comparison of the flight status information to the flight plan for the flight; and the program code configured, when a deviation of the estimated time of arrival at a particular point from the required time of arrival for the particular point becomes greater than a specified value, to generate a new four-dimensional flight plan and transmit an air traffic control clearance request, such that the new four-dimensional flight plan changes the deviation to the specified value or lower, wherein the flight status information includes at least one of aircraft position information, time, and weather information.

13. The computer program product of claim 12 further comprising:

program code, stored on the computer recordable non-transitory storage medium, for depicting the comparison in a four dimensional textual format.

14. The computer program product of claim 12 further comprising:

program code, stored on the computer recordable non-transitory storage medium, for depicting the comparison in a four dimensional tabular format.

15. The computer program product of claim 12, wherein the four dimensional flight information includes aircraft latitude, longitude, altitude and a current time associated with the latitude, the longitude, and the altitude.

16. The computer program product of claim 12, such that depicting, in the textual format on the display, uses a flight management system.

\* \* \* \* \*